United States Patent [19]

Roach

[11] 4,180,830
[45] Dec. 25, 1979

[54] DEPTH ESTIMATION SYSTEM USING DIFFRACTIVE EFFECTS OF THE GROOVES AND SIGNAL ELEMENTS IN THE GROOVES

[75] Inventor: William R. Roach, Rocky Hill, N.J.

[73] Assignee: RCA Corporation, New York, N.Y.

[21] Appl. No.: 810,735

[22] Filed: Jun. 28, 1977

[51] Int. Cl.² .................... G01N 21/32; G11B 11/00; H04N 5/76
[52] U.S. Cl. ........................... 358/128; 179/100.3 G; 179/100.3 V; 250/550; 250/562; 250/572; 356/355; 356/237
[58] Field of Search ................. 179/100.3 E, 100.3 G, 179/100.3 V, 100.4 R, 100.4 M, 100.4 C, 100.4 L, 100.1 B; 358/127, 128; 365/124; 346/33 F, 33 A; 356/111, 237; 250/550, 562, 572

[56] References Cited

U.S. PATENT DOCUMENTS

| | | | |
|---|---|---|---|
| 3,287,563 | 11/1966 | Clunis | 179/100.41 L |
| 3,833,769 | 9/1974 | Compaan et al. | 174/100.3 G |
| 3,842,194 | 10/1974 | Clemens | 358/128 |
| 3,860,766 | 1/1975 | Mori | 179/100.41 L |
| 3,919,465 | 11/1975 | Adler et al. | 179/100.3 V |
| 3,992,593 | 11/1976 | Heine | 179/100.41 L |
| 4,030,835 | 6/1977 | Firester et al. | 356/111 |
| 4,064,539 | 12/1977 | Lewiner et al. | 179/100.1 B |
| 4,069,484 | 1/1978 | Firester et al. | 346/33 F |

*Primary Examiner*—Raymond F. Cardillo, Jr.
*Attorney, Agent, or Firm*—E. M. Whitacre; J. S. Tripoli; J. E. Roehling

[57] ABSTRACT

Apparatus provides an incident light beam which illuminates the surface of a grooveddisc, having signal elements recorded therein in the form of a succession of spaced apart depressions, with a light spot that spans a plurality of convolutions of the groove. The structure of the grooved convolutions serves as a diffraction grating which reflects the incident light beam into a first plurality of substantially coplanar diverging beams of light. The signal elements also serve as a diffraction grating which reflects the incident light beam into a second plurality of diverging beams of light. Photodetectors, respectively positioned to intercept several of the reflected beams provide outputs corresponding to the light power in the respective reflected beams. Circuits are provided for directly deriving from the photodetector outputs respective estimations of both groove and signal element depths in the region illuminated by the light spot.

11 Claims, 4 Drawing Figures

DEPTH ESTIMATION SYSTEM USING DIFFRACTIVE EFFECTS OF THE GROOVES AND SIGNAL ELEMENTS IN THE GROOVES

The present invention relates generally to optical detection systems, and particularly to optical detection systems which may be employed to provide, in a regularly grooved surface, having a pattern of depressions formed in the groove, such as a video disc of the type described in U.S. Pat. No. 3,842,194 issued to Jon K. Clemens, respective estimations of groove depth and depression depth.

The depth estimation principles of the present invention are illustratively applicable and will be described with reference to optical inspection of spiral grooves for video disc records at various manufacturing stages throughout the record mastering and replicating processes, particularly after the formation of an information track, comprising signal elements in the form of spaced apart depressions having a uniform depth in the groove.

In one illustrative process of producing a video disc record having spiral grooves, a disc master (to be used for recording) is formed by (1) mechanically cutting a spiral groove of a trapezoidal cross-section in a copper-coated aluminum disc, and (2) coating the grooved surface with electron beam sensitive material. The coated disc is mounted on a turntable of an electron beam disc recorder in the path of a finely focused beam of electrons, that is turned on and off in response to a recording signal, to expose various portions of the groove bottom as the disc is rotated and translated with respect to the impinging beam to form signal elements. Those portions of the groove bottom struck by the electron beam are removed by subsequent development of the sensitive material. After exposure and development, the master disc has the relief pattern that is desired for the final records. Molds for making stampers for producing production line records are made from these masters. In the final stages of manufacturing a video disc, a vinyl substrate is formed with the desired relief pattern, using a stamper made from a mold; the substrate is coated with a metal by a vacuum sputtering process; the metal is coated with a styrene dielectric by a glow discharge process; and the styrene is coated with a layer of oil by an evaporation process.

In the processes for manufacturing a video disc record, such as the type supra, formulation of respectively uniform spiral groove and signal elements free of significant variations in their respective depth is an important factor for obtaining high quality video signal recordings. Each stage of record manufacture can be a critical stage wherein undesirable variations in groove and/or signal elements depth that affect the production of quality video records must be minimized.

Pursuant to an approach described in a copending U.S. Patent Application Ser. No. 810,736, of W. R. Roach, et al., filed on May. 28, 1977, concurrently herewith, an optical groove depth estimation system is provided for directing a beam of light at a disc having a grooved surface. The axis of the incident beam path lies in a non-parallel relationship, and at a chosen angle (e.g., 2°), with respect to the central axis of the disc. The incident beam axis is desirably positioned in a plane which is perpendicular to the disc surface and intersects the grooved surface along a tangent to a groove convolution at the point of incidence. The incident beam illuminates a portion of the surface and the groove convolutions effectively form a diffraction grating which reflects the incident beam forming an undeviated zero diffraction order beam of light and deviated higher diffraction order beams of light which diverge in a fan pattern from the point of incidence on the disc surface. A photodetector, positioned so that its photosensitive surface is successively brought in registry with the path of several of the reflected beams of light, is large enough to collect substantially all of the light within any one of the respective reflected beams. The measured light power contained in the respective reflected beams, determined by the particular geometry of the individual grooves, provides a basis for estimating groove depth. The output of the photodetector, as it scans along the reflected beams, being representative of the measured power in the respective reflected light beams, is compared to corresponding sets of theoretically derived values for light power in corresponding diffraction orders of an infinite plane wave incident on the assumed local groove shape of the inspected disc record as a function of groove depth. The result of this comparison provides an estimated groove depth value, which yields the best least squares fit between the measured values and the corresponding theoretical values.

In accordance with the principles of the present invention, the aforementioned groove depth estimation approach of Roach, et al. is advantageously employed to provide, in a relatively compact apparatus, a direct reading estimate of groove depth for a disc having a cross-sectionally sinusoidal groove. Advantage is taken of the recursion relation between the various Bessel functions which provide a model for the light power distribution in the respective reflected beams of light and the direct proportionality of the respective Bessel functions to the light power of reflected light for sinusoidal grooves. By a simple calculating process, a groove depth estimate may be derived from the measured light powers.

In further accordance with the principles of the present invention, continuous monitoring of the reflected light beams is achieved by an arrangement whereby a plurality of photodetectors are positioned in the path of the reflected beams. The output of the respective photodetectors are applied to a calculating apparatus which provides a direct reading estimate of groove depth in the illuminated region. The provision of stationary detectors mechanically simplifies the entire apparatus, improves ruggedness and ease of operation and therefore reduces probability of error introduced by spurious components resulting from motion of apparatus parts.

In accordance with one aspect of the present invention, relative motion between the grooved surface and the incident beam is established in such a manner that a succession of regions of the grooved surface are scanned by the incident light beam in a circular pattern to provide an "average groove depth" estimate at the illuminated radius. Since the grooved disc cannot be assumed to be precisely axially symmetric, the diffraction spectrum, generated by the diffraction of the incident light beam off the grooved surface of the disc record, is affected by the aforesaid relative motion. However, in practice, the azymuthal dependence of the measured diffraction spectrum is small and the powers in the various orders can be averaged over a chosen radius of the grooved disc, and, therefore, the derived groove depth estimate, based on average light power in the respectively measured reflected beams is representative of an "average groove depth" at the inspected radius of the disc.

In further accordance with the principles of the present invention, where the region of the disc surface illuminated also contains signal elements inscribed in the groove by means of successive depressions, these signal elements effectively form an additional diffraction grating. This additional diffraction grating reflects the incident beam forming an undeviated zero diffraction order spray of light and higher order deviated diffraction order sprays of light which divergently radiate from the illuminated spot. The spatial location of the diffraction spectrum resulting from the signal elements, is easily located and the relative light powers contained in the respective reflected sprays can be easily determined by means of photodetectors. The measured light power contained in the respective reflected sprays of the diffraction spectrum of the signal elements, determined by the particular geometry of the signal elements, provides a basis for estimating signal element depth.

Pursuant to one aspect of the present invention, where the signal elements can be assumed to be approximately sinusoidal in cross-section in the direction of the groove elongation, advantage is taken of the recursion relation between the various Bessel functions which provide a model for the light power distribution in the respective reflected sprays of light and the direct proportionality of the respective Bessel functions to the light power of reflected light. By a simple calculating process, a signal element depth estimate may be derived from the measured light powers.

Pursuant to a further aspect of the present invention, where relative motion between the light spot and the grooved surface is established in the manner discussed above, the powers in the various orders, of the diffraction spectrum resulting from the signal elements, can be averaged over the chosen radius of the grooved disc. The derived signal element depth estimate, based on the average light power in the respectively measured reflected sprays is representative of an "average signal element depth" at the inspected radius of the disc.

Figure 1:
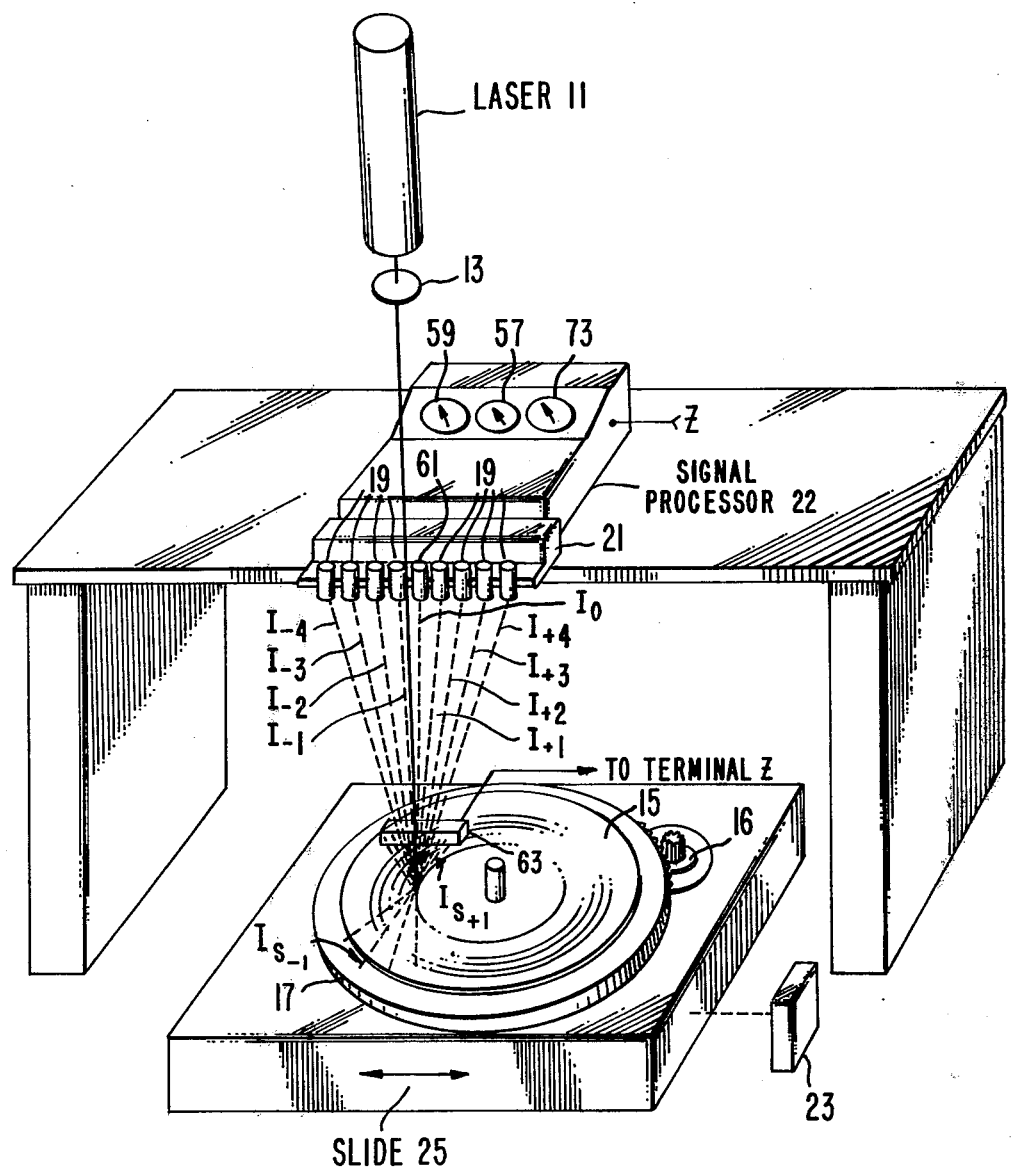
FIG. 1 illustrates, in a perspective view, an apparatus forming a portion of a groove and signal element depth estimation system embodying the principles of the present invention.

Referring to FIG. 1, a coherent light beam from a light source 11 (illustratively in the form of a laser) can be focused by a lens 13 toward a focus point near the surface of a grooved disc 15 supported on a turntable 17. The focused beam illuminates the grooved surface with a light spot having a half intensity contour that spans a plurality of groove convolutions.

The orientation of the incident beam is desirably such that the axis of the incident beam lies at a slight angle (e.g., 2°) to the central axis of the record and lies in a plane which is perpendicular to the disc and which is tangent to the groove. In addition to making the zero order beam accessible for measurement this orientation will produce a symmetrical diffraction pattern if the grooves are symmetrical.

The groove structure in the illuminated region, provides a regular pattern of depressions and elevations, which serves as a diffraction grating (with a grating pitch determined by the groove convolution pitch and a depth determined by the bare groove and including an average contribution from signal elements, if any are present) to diffract the light reflected by the illuminated disc surface region in a fixed pattern. In the isometric illustration of FIG. 4 a cross-section of a video disc is taken transverse of the groove elongation. This cross-section illustrates a sinusoidal groove structure having a regular pattern of elevations and depressions. Pits 101, 102 and 103 illustrate signal elements recorded along the groove elongation. A cross-section (formed by a plane cutting along the groove elongation, through the center of the groove and perpendicular to the disc surface) of the groove bottom would illustrate a square wave shape of the signal elements. In another embodiment the cross-section (through the center of the groove) of the groove bottom would illustrate the sinusoidal shape of the signal elements (not shown in Figure). This light diffraction results in the formation of an undeviated zero diffraction order beam of light and a plurality of additional, deviated beams of light $I_n$, where n is an integer corresponding to higher diffraction orders, diverging in a fan pattern from the illuminated grooved surface.

A plurality of photodetectors 19 are positioned on a platform 21 so that their respective photosensitive surfaces are in registry with the path of respective diffraction order beams of light 19 (e.g., the deviated higher diffraction order beams of light up to the fifth order). The outputs of the respective photodetectors are respectively applied to a signal processor apparatus 22 which provides, on appropriate respective indicators, an estimate of groove depth and error in accordance with the measured data.

Where an average groove depth estimation value is desired for a given radius of the disc 15, the disc is rotated by means of a turntable motor 16. The disc 15 may also be translated in a radial direction (e.g., through use of a suitable drive source 23 to effect translation of a slide 25 upon which the motor driven turntable 17 is supported) to provide readings at selected radii of the disc.

It will be appreciated that for a uniform infinite wave front the light intensity at the nth principle maximum of the diffraction spectrum of a one-dimensional phase grating is given by:

$$I = K \left| \int_0^w e^{i(\phi(z) - \frac{2\pi n z}{w})} dz \right|^2,$$

where $\phi(z)$ is the phase retardation introduced at position z in a groove and the integration in z is over w, the width of a single groove and K is a constant. In the case of a sinusoidal reflection grating:

$$\phi(x) = \Delta \sin (2\pi z/w),$$

where $\Delta$ is the peak to peak optical depth of the grating in radians. The light power in nth order reflected beams (i.e., $I_{-n}, I_{+n}$) becomes:

$$I_n = K \left| \int_0^w e^{i(\Delta \sin \frac{2\pi z}{w} - \frac{2\pi n z}{w})} dz \right|^2.$$

which for a groove having a sinusoidal cross section reduces to:

$$I_n = [J_n(\Delta)]^2.$$

where $J_n(\Delta)$ is the Bessel function of order n (the character m being alternatively used to denote an order which is different from the order n) and argument $\Delta$.

For a bare groove the arguent $\Delta$ is simply:

$$\Delta = 2\pi/\lambda \, d,$$

where d is the depth of the groove and $\lambda$ is the incident beam wavelength.

Furthermore, the recursion relation which exists between the Bessel functions can be expressed as:

$$\Delta = \frac{2n J_n(\Delta)}{J_{n-1}(\Delta) + J_{n+1}(\Delta)}$$

and for $J_{n-1}$, $J_n$ and $J_{n+1} > 0$, $\Delta$ can be expressed in terms of light power in the respective nth order reflected beams:

$$\Delta = \frac{2n \sqrt{I_n}}{\sqrt{I_{n-1}} + \sqrt{I_{n+1}}}$$

For purposes of illustration, processor 22 operation will be explained with reference to its operation on light power data derived from the First through Fourth orders of reflected beams. Two estimates of groove depth (d), derived from such data, can be expressed as:

$$d1 = \frac{\lambda}{2\pi} \cdot \frac{4\sqrt{I_2}}{\sqrt{I_1} + \sqrt{I_3}}; \text{ and}$$

$$d2 = \frac{\lambda}{2\pi} \cdot \frac{6\sqrt{I_3}}{\sqrt{I_2} + \sqrt{I_4}}$$

From these two values for (d), an average value $(d1+d2)/2$ and an error estimation $(d1-d2)/2$ can be derived.

Since the $J_1$ term changes signs as groove depth exceeds a certain value (e.g., a value representative of a 0.38 micron groove depth where the illuminating beam is of a wavelength corresponding to 0.6328 microns), care must be taken to account for such change.

Proceeding to the operation of processor 22, explained with reference to FIG. 2, the light power in each nth order reflected beams (i.e., $I_{+n}$ and $I_{-n}$) is determined by respectively summing in an amplifier 27 the outputs of the corresponding photodetectors intercepting such beams. The outputs of the amplifiers 27 are applied to respective square root operator stages 29, which stages 29 provide outputs which correspond to the square roots of the respectively applied signal (designated $\sqrt{I_1}$, $\sqrt{I_2}$, $\sqrt{I_3}$, and $\sqrt{I_4}$ in FIG. 2). Output $\sqrt{I_1}$ is applied through an electronic switch 31, normally by-passing an inverter 33, the operation of which will be discussed hereinafter, to one input of a first summing amplifier 35 which also receives output $\sqrt{I_3}$. A second summing amplifier 37 receives outputs $\sqrt{I_2}$ and $\sqrt{I_4}$, while a multiplier of four stage 39 and a multiplier of six stage 41 respectively receive outputs $\sqrt{I_2}$ and $\sqrt{I_3}$.

The outputs of multiplier stages 39 and 41 are respectively applied to divider stages 43, 45 wherein they are respectively divided by the outputs of summing amplifiers 35, 37 and a constant representing a conversion factor (i.e., $2\pi/\lambda$).

The output of divider 45, corresponding to an estimate for groove depth is applied to comparator 47. When the input to comparator 47 exceeds a preset value (e.g., for $\lambda = 0.6328\mu$ a value representative of a 0.38 micron groove depth) comparator 47 provides an output which is applied to move switch 31 to the dashed line position illustrated, thereby coupling output $\sqrt{I_1}$ to summing amplifier 35 through inverter 33 to effect the aforementioned data entries correction for the sign change of the $J_1$ term.

The outputs of divider stages 43, 45 are respectively summed in amplifier 49 and subtracted in amplifier 51. The output of amplifier 49 when divided by 2 in amplifier 53 provides an output corresponding to an estimate of groove depth, while the output of amplifier 51 when divided by two in amplifier 55 provides an estimate of the error in groove depth estimation, which estimates may be readily displayed on respective indicators 57, 59 in the signal processor of FIG. 1.

Figure 3:
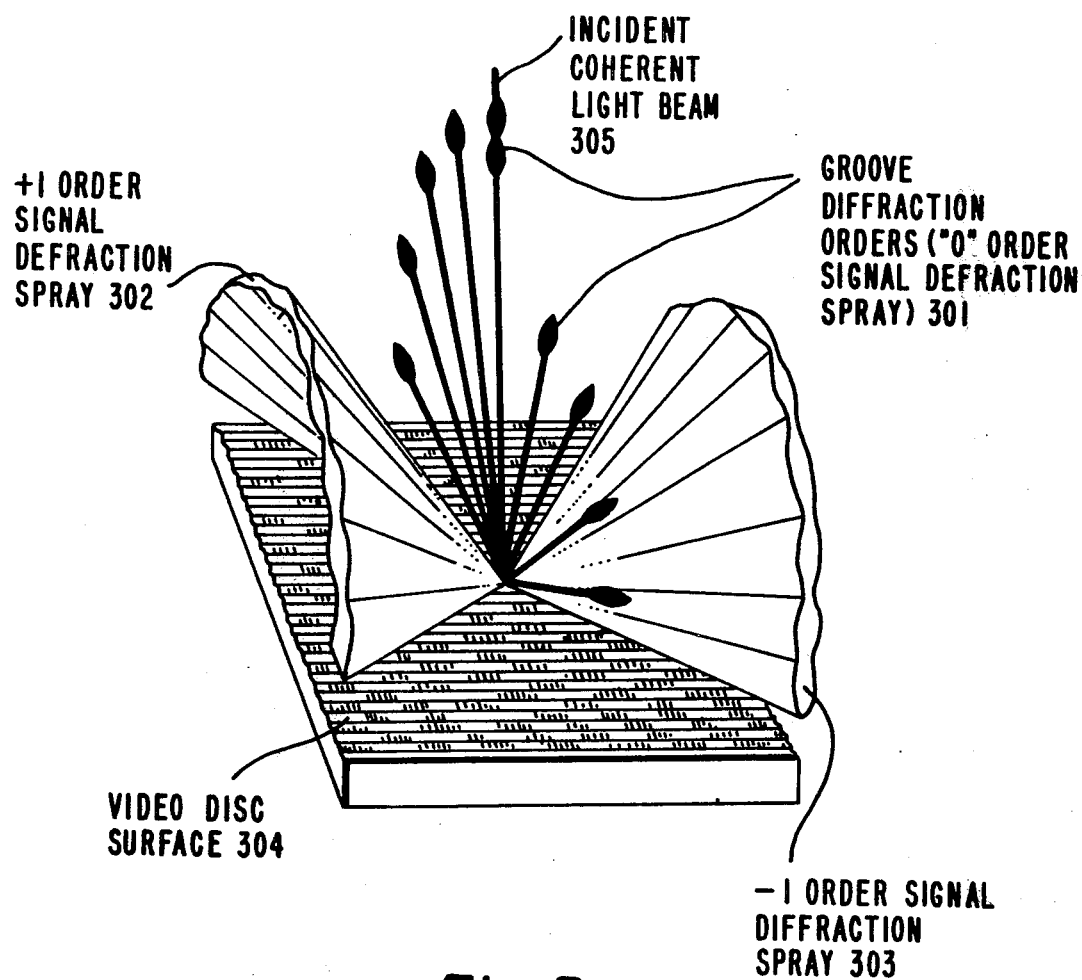
FIG. 3 illustrates a diffraction pattern produced by a grooved video disc surface having signal elements recorded in the grooves when a plurality of grooves are illuminated with a coherent light beam.

In addition to the aforementioned diffraction spectrum 301, FIG. 3 generated by the grooves, a second diffraction spectrum is generated when the illuminated surface region contains signal elements. This additional spectrum is subject to being separately detected from the diffraction spectrum resulting from the grating formed by the groove convolutions.

Figure 4:
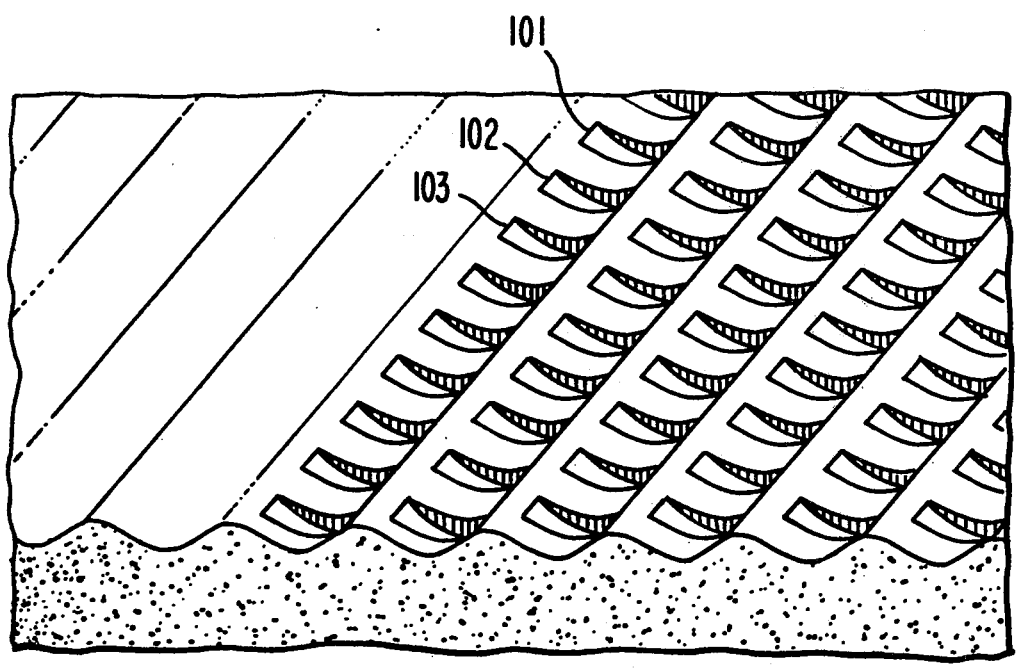
FIG. 4 illustrates in isometric form a portion of a video disc surface having a sinusoidal pattern of groove convolutions with signal elements recorded therein.

The signal element structure in the illuminated region, provides a regular pattern of depressions pits 101, 102, and 103 of FIG. 4 and elevations, which serves as a diffraction grating (with a grating pitch determined by the density of the signal elements) to diffract the light reflected by the illuminated disc surface region in a fixed pattern. This light diffraction results in the formation of an undeviated zero diffraction order spray of light $I_{so}$ 301, FIG. 3 and a plurality of additional, deviated higher diffraction order sprays of light $I_{sn}$, where n is an integer, diverging from the illuminated grooved surface. Referring to FIG. 3, a video disc surface 304 having signal elements recorded in the grooves is illuminated with a coherent light beam 305. The $I_{ns}$ sprays are illustrated by a +1 order signal diffraction spray $I_{s+1}$ 302 and a −1 order signal diffraction spray $I_{s-1}$ 303.

Where the signal elements may be safely assumed to possess an approximately sinusoidal profile in the direction of the groove elongation, the total light power diffracted into the various orders can be expressed as:

$$I_{sn} = K[J_n(Sd)]^2.$$

where K is a constant and $J_n(Sd)$ is the Bessel function of order n and argument Sd, which argument corresponds to the depth of the signal element in radians.

Taking advantage, again, of the recursion relation between the various Bessel functions Sd can be expressed as:

$$Sd = \frac{2n\, J_n(Sd)}{J_{n-1}(Sd) + J_{n+1}(Sd)};$$

and for n=1

$$Sd = \frac{2 J_1(Sd)}{J_0(Sd) + J_2(Sd)};$$

and substituting for $J_n$ in terms of $I_n$:

$$Sd = \frac{2\sqrt{I_{s+1}}}{\sqrt{I_{s_o}} + \sqrt{I_{s+2}}}.$$

While an estimate of signal element depth Sd can be calculated from the above expressions after the measurement of light power in the $I_{s+1}$, $I_{s+2}$ and $I_{s_o}$ diffraction order sprays, it will be appreciated that for the illustrative grooved disc (i.e., the aforementioned Clemens video disc record) signal element depth is shallow (e.g., less than one micron in depth), and for shallow signal element depths, the light power in the second diffraction order sprays of light is negligible and can be ignored without materially affecting the result. Therefore, the signal element depth estimate equation can be expressed as:

$$Sd = \frac{2\sqrt{I_{s+1}}}{\sqrt{I_{s_o}}}.$$

An arrangement to provide light power measurements for the $I_{s+1}$ spray and the $I_{s_o}$ is shown in FIG. 1. A photodetector 61 is arranged on platform 21 to intercept substantially all the light contained in the undeviated zero diffraction order beam of light ($I_o$). An additional photodetector 63, having a large photosensitive surface, is positioned in a plane which is angularly disposed with respect to the grooved disc surface and which laterally intersects the groove convolutions. Photodetector 63 intercepts substantially all the light diffracted from the illuminated region on one side of a radial plane which contains the illuminated spot and the disc center. The intercepted light substantially corresponds to the diffracted $I_{s+1}$ spray.

Figure 2:
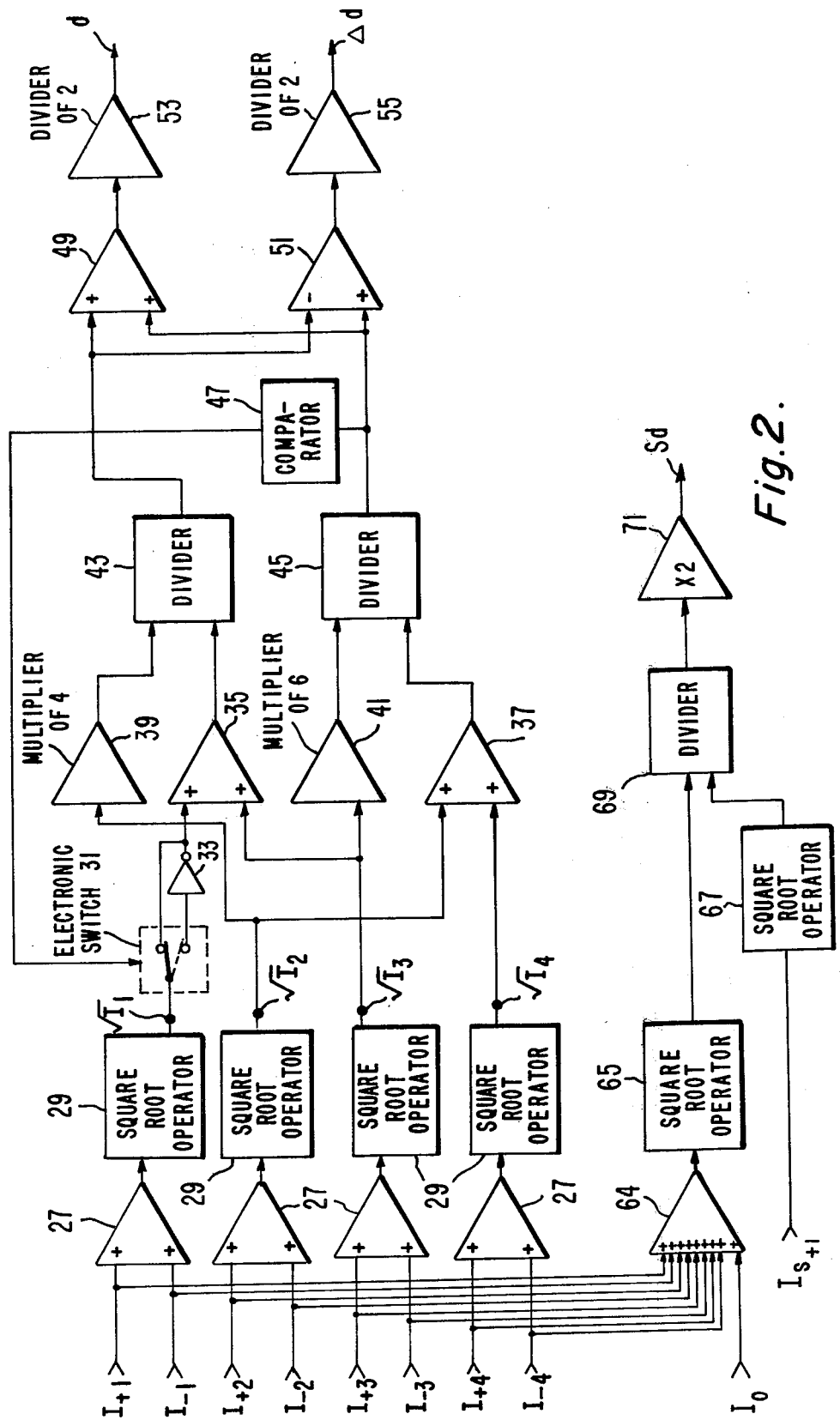
FIG. 2 illustrates a groove depth calculating apparatus, forming a portion of the apparatus of FIG. 1, for processing the information generated by the respective photodetectors.

FIG. 2 further illustrates a computing apparatus to which the outputs of photodetectors 19, 61, 63 are respectively applied. The outputs from detectors 19, 63, which intercept a substantial portion of the light of the zero order spray, are applied to a summing amplifier 64 to provide a measure of the zero diffraction order spray ($I_{s_o}$). A pair of square root operators 65, 67 are respectively provided for processing the measured light power in the $I_{s_o}$ and $I_{s+1}$ sprays of light. A divider 69 divides the output of operator 65 by the output of operator 67. After multiplication by 2 in amplifier 71, the output of divider 69 then corresponding to a signal element depth estimate (Sd) can be displayed on an appropriate indicator 73, shown in FIG. 1.

Where the disc is rotated during signal element depth estimation procedure, the value displayed on indicator 73 will correspond to an "average" signal depth estimate at the radius of the disc.

What is claimed is:

1. Apparatus, for use with a flat surface which is regularly grooved with groove segments of substantially sinusoidal cross-sectional shape, for estimating groove depth; said apparatus comprising:
    means for illuminating a region of the grooved surface, the illuminated region being sufficiently large to span a plurality of groove segments; the structure of the groove segments in the surface region illuminated serving as a diffraction grating for diffracting light reflected from said illuminated region to form respectively separated diffraction order beams of light;
    means for detecting the light power contained in each of a plurality of said diffraction order beams of light;
    means, coupled to the output of said detecting means, for deriving a groove depth estimate as a ratio of the square root of the light power of an nth order diffraction beam multiplied by 2n over the sum of the square roots of the light powers of respective n−1th and n+1th order diffraction beams.

2. Apparatus in accordance with claim 1 wherein said detecting means includes:
    a plurality of photodetectors positioned to intercept respective ones of a plurality of said diffraction order beams of light.

3. Apparatus in accordance with claim 1 further comprising:
    means for deriving an additional groove depth estimate as a ratio of the square root of the light power of an mth order diffraction beam multiplied by 2m over the sum of the square roots of the light powers of respective m−1th and m+1th order diffraction beams, m being different from n; and
    means for averaging the respective outputs of said estimate deriving means and said additional deriving means.

4. Depth estimating apparatus for use with a spiral groove, having a substantially sinusoidal cross-sectional shape and including spaced apart depressions formed along the bottom of the groove, said groove being formed in a surface of a disc comprising:
    means for illuminating a region of the grooved surface, the illuminated region being sufficiently large to span a plurality of groove convolutions; the structure of the groove convolutions in the surface region illuminated serving as a diffraction grating for diffracting light reflected from said illuminated region to form respectively separated diffraction order beams of light;
    means for simultaneously detecting the light power contained in each of a plurality of said diffraction order beams of light; and
    means, coupled to the output of said detecting means, for deriving a groove depth estimate as a ratio of the square root of the light power of an nth order diffraction beam multiplied by 2n over the sum of the square roots of the light powers of respective n-1th and n+1th order diffraction beams.

5. Apparatus in accordance with claim 4 further comprising means for establishing relative motion between the illuminating means and the disc surface in a manner causing the illuminating means to successively illuminate regions of the grooved surface which are at substantially equal radial distances from a center of the disc.

6. Apparatus in accordance with claim 4 further comprising:

means for deriving an additional groove depth estimate as a ratio of the square root of the light power of an mth order diffraction beam multiplied by 2m over the sum of the square roots of the light powers of respective m−1th and m+1th order diffraction beams, m being different from n; and means for averaging the respective outputs of said estimate deriving means and said additional deriving means.

7. Apparatus in accordance with claim 4 wherein:

the structure of the depressions in the surface region illuminated serves as a diffraction grating for diffracting light reflected from said illuminated region to form respectively separated, diffraction order sprays of light; and wherein said apparatus further includes:

means for detecting the light power contained in each of a plurality of diffraction order sprays of light; and means for deriving a depression depth estimate in response to the output of said spray detecting means.

8. Apparatus in accordance with claim 7 wherein said spray detecting means comprises:

means for detecting the light power contained in the zero diffraction order spray of light; and additional means for detecting substantially all the light diffracted on one side of a plane which radially, orthogonally intersects the surface of the disc and includes the illuminated region.

9. Apparatus in accordance with claim 8 wherein said depression depth deriving means comprises:

means for summing the outputs of said diffraction order beams detecting means; and means for providing a ratio of the square root of the output of said additional detecting means over the square root of the output of said summing means.

10. Apparatus, for use with a flat surface which is regularly grooved with groove segments and which is provided with successively spaced apart depressions of a given cross-sectional shape formed in the grooves, for estimating depression depth; said apparatus comprising:

means for illuminating a region of the grooved surface, the illuminated region being sufficiently large to span a plurality of groove segments;

the structure of the depressions in the surface region illuminated serving as a diffraction grating for diffracting light reflected from said illuminated region to form respectively separated diffraction order sprays of light;

means for detecting the light power contained in at least two of said diffraction order sprays of light; and means, responsive to the output of said detecting means, for deriving an estimate of depression depth for the given cross-sectional shape of the depression.

11. Apparatus in accordance with claim 10 wherein:

the structure of the groove segments in the surface region illuminated serving as a diffraction grating for diffracting light reflected from said illuminated region to form respectively separated diffraction order beams of light; and wherein said apparatus further comprises:

means for detecting the light power contained in each of a plurality of said diffraction order beams of light;

means, coupled to the output of said detecting means, for deriving a groove depth estimate as a ratio of the square root of the light power of an nth order diffraction beam multiplied by 2n over the sum of the square roots of the light powers of respective n−1th and n+1th order diffraction beams.

* * * * *

UNITED STATES PATENT AND TRADEMARK OFFICE
CERTIFICATE OF CORRECTION

PATENT NO. : 4,180,830

DATED : December 25, 1979

INVENTOR(S) : William R. Roach

It is certified that error appears in the above-identified patent and that said Letters Patent is hereby corrected as shown below:

Title Page, Abstract Line 1 - "grooveddisc," should read -- groove disc,--

Column 1, line 59 - delete the period after the word "May"

Column 4, line 64 - "$\phi(x)=\Delta\sin(2\pi z/w)$," should read -- $\phi(z)=\Delta\sin(2\pi z/w)$,--

Column 5, lines 11, 12 & 13 - delete "(the character m being alternatively used to denote an order which is different from the order n)"

Column 6, line 47 - "$I_{so}301$" should read -- $I_{s_o}301$ --

Column 6, line 48 - "$I_{sn}$," should read -- $I_{s_n}$, --

Column 6, line 52 - "$I_{ns}$" should read -- $I_{s_n}$ --

Column 6, line 53 - "$I_{s+1}$" should read -- $I_{s_{+1}}$ --

Column 6, line 54 - "$I_{s-1}$" should read -- $I_{s_{-1}}$ --

Column 6, line 61 - "$I_{sn}=K[J_n(Sd)]^2$." should read -- $I_{s_n} = K[J_n(Sd)]^2$. --

UNITED STATES PATENT AND TRADEMARK OFFICE
CERTIFICATE OF CORRECTION

PATENT NO. : 4,180,830

Page 2 of 3

DATED : December 25, 1979

INVENTOR(S): William R. Roach

It is certified that error appears in the above-identified patent and that said Letters Patent is hereby corrected as shown below:

Column 6, line 64 - after "n" add the following:
-- (the character m being alternatively used to denote an order which is different from the order n)--

Column 7, line 15 - "$Sd = \dfrac{2\sqrt{I_{s+1}}}{\sqrt{I_{so}} + \sqrt{I_{s+2}}}$" should read --$Sd = \dfrac{2\sqrt{I_{s+1}}}{\sqrt{I_{s_o}} + \sqrt{I_{s_{+2}}}}$--

Column 7, line 19 - "$I_{s+1,}$" should read -- $I_{s_{+1}},$ --

Column 7, line 19 - "$I_{s+2,}$" should read -- $I_{s_{+2}}$ --

Column 7, line 19 - "$I_{so}$" should read -- $I_{s_o}$ --

Column 7, line 33 - "$Sd = \dfrac{2\sqrt{I_{s+1}}}{\sqrt{I_{so}}}$" should read --"$Sd = \dfrac{2\sqrt{I_{s_{+1}}}}{\sqrt{I_{s_o}}}$--

Column 7, line 36 - "$I_{s+1}$" should read -- $I_{s_{+1}}$ --

Column 7, line 37 - "$I_{so}$" should read -- $I_{s_o}$ --

Column 7, line 49 - "$I_{s+1}$" should read -- $I_{s_{+1}}$ --

UNITED STATES PATENT AND TRADEMARK OFFICE
CERTIFICATE OF CORRECTION

PATENT NO. : 4,180,830

DATED : December 25, 1979

INVENTOR(S): William R. Roach

It is certified that error appears in the above-identified patent and that said Letters Patent is hereby corrected as shown below:

Column 7, line 56 — "$(I_{so})$" should read -- $(I_{s_o})$ --

Column 7, line 58 — "$I_{so}$" should read -- $I_{s_o}$ --

Column 7, line 58 — "$I_{s+1}$" should read -- $I_{s_{+1}}$ --

Column 7, line 66 — " wiil" should read -- will --

Signed and Sealed this

Twenty-fifth Day of March 1980

[SEAL]

*Attest:*

*Attesting Officer*

SIDNEY A. DIAMOND

*Commissioner of Patents and Trademarks*